(12) United States Patent
Loiseau et al.

(10) Patent No.: US 10,003,191 B2
(45) Date of Patent: Jun. 19, 2018

(54) SPACE EFFICIENT AND POWER SPIKE RESISTANT ESD POWER CLAMP WITH DIGITALLY TIMED LATCH

(71) Applicant: INTERNATIONAL BUSINESS MACHINES CORPORATION, Armonk, NY (US)

(72) Inventors: Alain Loiseau, Williston, VT (US); Andreas D. Stricker, Milpitas, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 400 days.

(21) Appl. No.: 14/933,377

(22) Filed: Nov. 5, 2015

(65) Prior Publication Data

US 2017/0133840 A1    May 11, 2017

(51) Int. Cl.
*H02H 9/00*    (2006.01)
*H02H 9/04*    (2006.01)

(52) U.S. Cl.
CPC ..................... *H02H 9/04* (2013.01)

(58) Field of Classification Search
USPC .......................................................... 361/56
See application file for complete search history.

(56) References Cited

U.S. PATENT DOCUMENTS

| | | | | |
|---|---|---|---|---|
| 5,789,964 A | * | 8/1998 | Voldman | H01L 27/0248 327/380 |
| 5,835,328 A | * | 11/1998 | Maloney | H02H 9/046 361/111 |
| 8,339,756 B2 | | 12/2012 | Maloney et al. | |
| 2009/0154035 A1 | * | 6/2009 | Galvano | H02H 9/046 361/56 |
| 2010/0246076 A1 | * | 9/2010 | Campi, Jr. | G06F 17/5045 361/56 |
| 2010/0254051 A1 | * | 10/2010 | Jeon | H02H 9/046 361/56 |
| 2011/0216454 A1 | * | 9/2011 | Wang | H02H 9/04 361/56 |

(Continued)

FOREIGN PATENT DOCUMENTS

WO    2015065480 A1    5/2015

*Primary Examiner* — Ronald W Leja
(74) *Attorney, Agent, or Firm* — Cantor Colburn LLP; Steven Meyers (57) ABSTRACT

Embodiments include a system, apparatus, and method for ESD power clamps. Aspects include protecting a circuit using an ESD power clamp device. The ESD power clamp device includes a trigger circuit having a resistor-capacitor network and an inverter stage circuit, wherein the trigger circuit is configured to detect an ESD event. Aspects of the invention further include a timing circuit coupled to the trigger circuit and a timing controlled transistor, wherein the timing circuit controls the timing controlled transistor to prevent the capacitor in the RC network from charging when the timing circuit is initiated. Aspects also include a clamp transistor coupled to the trigger circuit, wherein the clamp transistor is controlled by a signal received from the trigger circuit, and a timing controlled transistor coupled to the trigger circuit and the timing circuit, where the timing controlled transistor switches states based on the output of the timing circuit.

20 Claims, 7 Drawing Sheets

(56) References Cited

U.S. PATENT DOCUMENTS

| | | | |
|---|---|---|---|
| 2013/0016445 A1* | 1/2013 | Liu | H02H 9/046 |
| | | | 361/56 |
| 2013/0170081 A1* | 7/2013 | Singh | H02H 9/046 |
| | | | 361/56 |
| 2015/0124360 A1 | 5/2015 | Jack et al. | |
| 2017/0133840 A1* | 5/2017 | Loiseau | H02H 9/04 |

* cited by examiner

SPACE EFFICIENT AND POWER SPIKE RESISTANT ESD POWER CLAMP WITH DIGITALLY TIMED LATCH

BACKGROUND

The present disclosure relates to circuit protection provided by a power clamp and more specifically, to space efficient and power spike resistant ESD power clamp with digitally timed latch.

In today's environment, clamp circuits are used to provide protection to integrated circuits and devices from the buildup and discharge of electrostatic energy. At the onset of an ESD event devices must be able to detect and safely discharge this energy without causing damage to the protected device. Power clamps use RC networks to detect ESD events. RC networks of regular power clamps have to be configured such that their time constants are significantly longer than the 10 ns ESD rise time, while simultaneously being significantly shorter than the normal operation power supply ramp time. For these reasons, a typical RC value is 1 μs and the power supply rise time is restricted to values longer than 100 μs. Achieving a 1 μs time constant requires large resistors and capacitors that have a large footprint. There is a need for space efficient and reliable power clamps to enable the protection of devices with fast power supply ramp times.

SUMMARY

In accordance with an embodiment of the invention, a system and method for space efficient and power spike resistant ESD power clamp with digitally timed latch is reviewed. The system includes using a clamping device comprising a trigger circuit including a resistor-capacitor (RC) network and an inverter stage circuit, wherein the trigger circuit is configured to detect an electrostatic discharge (ESD) event. The system further includes a clamp transistor being coupled to the trigger circuit, wherein the clamp transistor is controlled by a signal received from the trigger circuit, and a timing circuit coupled to the trigger circuit and the timing controlled transistor, wherein the timing circuit controls the timing controlled transistor to prevent the capacitor in the RC network from charging when the timing circuit is initiated. The system includes the timing controlled transistor coupled to the trigger circuit and the timing circuit, wherein the timing controlled transistor switches states based on the output of the timing circuit.

In accordance with another embodiment of the invention, an apparatus for space efficient and power spike resistant ESD power clamp with digitally timed latch is also reviewed. The power clamp apparatus for protecting a circuit includes a trigger circuit comprising an RC network and an inverter stage circuit, wherein the trigger circuit is configured to detect an electrostatic discharge (ESD) event. The apparatus also includes a clamp transistor coupled to the trigger circuit, wherein the clamp transistor is controlled by a signal received from the trigger circuit and a timing circuit coupled to the trigger circuit and the timing controlled transistor, wherein the timing circuit controls the timing controlled transistor to prevent the capacitor in the RC network from charging when the timing circuit is initiated. The apparatus includes the timing controlled transistor further being coupled to the trigger circuit and the timing circuit, wherein the timing controlled transistor switches states based on an output of the timing circuit.

In accordance with a further embodiment of the invention, the method for operating a space efficient and power spike resistant ESD circuit is presented. The method includes a method for protecting a circuit using a power clamp device by detecting an ESD event at a trigger circuit, wherein the trigger circuit includes an RC network and an inverter stage, and providing, by the trigger circuit, a signal to activate a clamp transistor, wherein the detection is based on the detecting the ESD event and the clamp transistor provides a path to discharge an ESD signal. The method further includes generating by a timing circuit a timing signal to control a timing controlled transistor, wherein the timing controlled transistor prevents a capacitor in the RC network of the trigger circuit from charging for a period of time when the ESD event is detected.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

In accordance with exemplary embodiments of the disclosure, a system, apparatus, and method for space efficient and power spike resistant ESD power clamps with digitally timed latches are provided. An exemplary embodiment includes providing a protection circuit being coupled between a power supply and ground and further coupling the protection circuit either serially or in parallel with the device or IC to be protected. Other exemplary embodiments include utilizing a timing circuit to control the RC network of a trigger circuit, and more specifically utilizing the timing circuit to prevent the capacitor of the RC network from charging up. Exemplary embodiments further include activating the clamp transistor and activating the timing circuit upon detection of an ESD event. Also exemplary embodiments include using a very small RC delay to improve sensitivity to noise and allow for faster power supply ramp times. In general, power supply ramp times used today are significantly larger than 1 μs to accommodate the prior art ESD power clamps. The power clamp of the invention can manage very fast power supply ramp times by making use of the timing circuit.

Another exemplary embodiment of the invention allows for the use of a small RC to trigger the power clamp in conjunction with a digital timer to keep the power clamp active during an ESD event. In essence the timing circuit is responsible for controlling the power clamp instead of the power clamp being controlled by the RC network of the trigger circuit. Exemplary embodiments include utilizing a small RC network to reduce the footprint of the protection circuit on the IC or circuit board. Although this disclosure generally refers to this specific embodiment, it will be apparent to those of ordinary skill in the art that the system, apparatus, and method taught herein can be used for protection to any IC or device.

Figure 1:
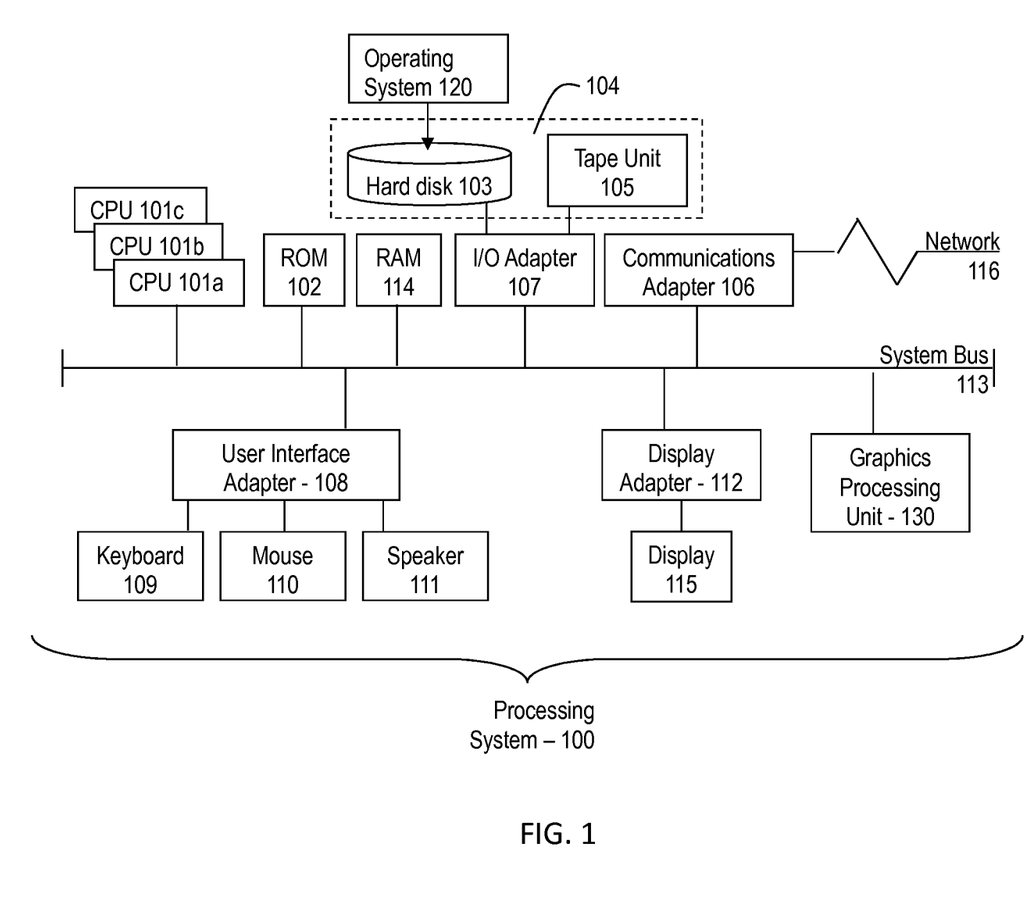
FIG. 1 is a block diagram illustrating one example of a processing system for practice of the teachings herein.

Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 1. In an exemplary embodiment of the invention, the circuit protection may be used to protect a system such as shown in FIG. 1 or may be implemented in the system.

Figure 2:
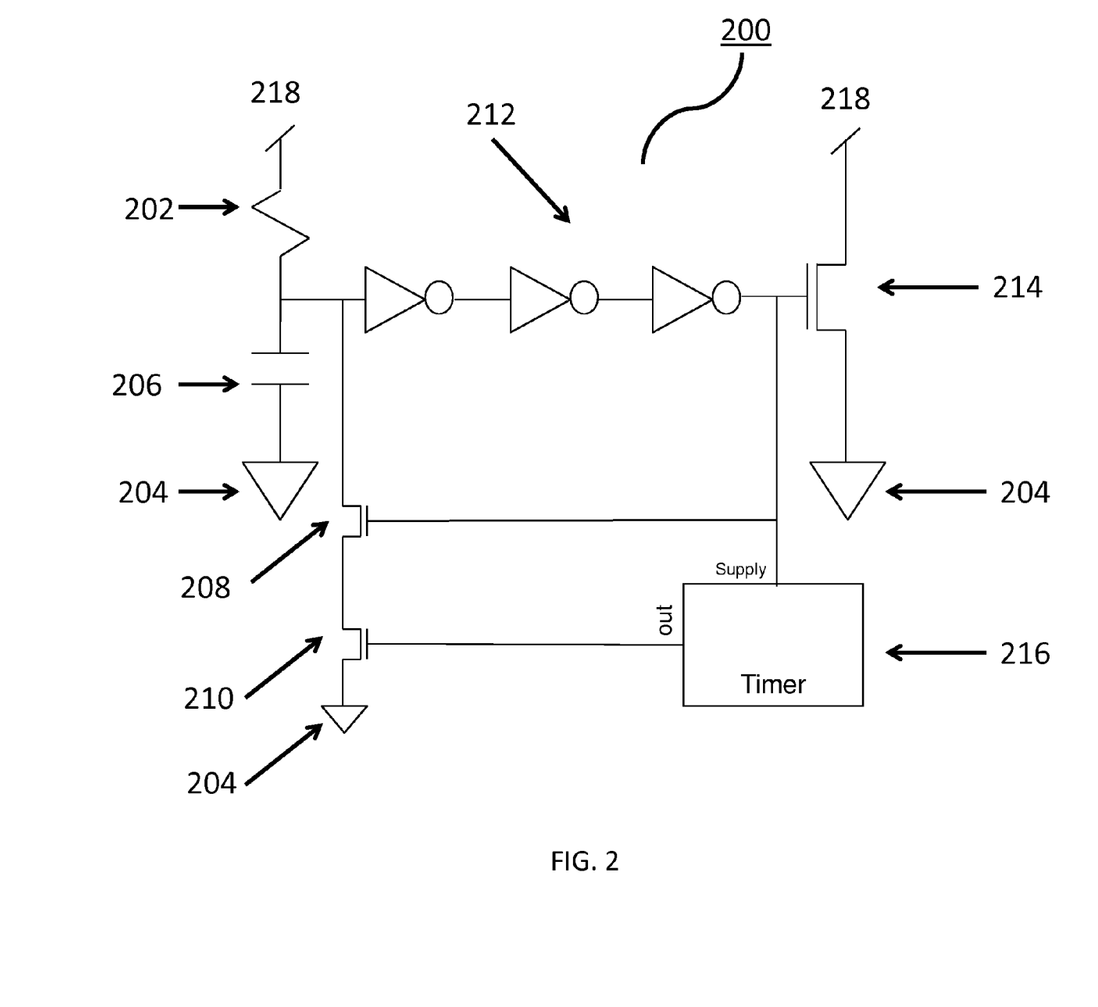
FIG. 2 is a block diagram illustrating an ESD power clamp in accordance with an exemplary embodiment.

Referring now to FIG. 2, there is shown an embodiment of a system for implementing the teachings herein. System 200 includes resistor 202 and capacitor 206 which is referred to as an RC network. In an exemplary embodiment of the invention the RC constant can be configured to be less than 25 ns instead of 1 μs as it has traditionally been done. This would reduce the footprint of the RC network on the device (e.g. in a 14 nm node the footprint would be reduced by 625 μm²). Additionally, the system would be less sensitive to faster power supply ramps and noise events due to fast 25 ns RC constant. The RC network is connected to power supply 218 and ground 204. The RC network is also connected to an inverter stage 212, which provides a signal to clamp transistor 214. Although the inverter stage 212 includes a series of three inverters, in other exemplary embodiments the inverter stage can be constructed with any number of inverters. The RC network and inverter stage are referred to as a trigger circuit. When an ESD event is detected by the RC network, inverter stage 212 supplies a signal to the gate of clamp transistor 214. The other terminals of clamp transistor 214 are connected to power supply 218 and ground 204. When the signal provided from the inverter stage 212 turns clamp transistor 214 ON, the system is able to provide a path to ground 204 through clamp transistor 214 in order to provide protection to a connected circuit or device.

FIG. 2 further depicts a timing circuit 216 in system 200. The timing circuit 216 is coupled to the output of the inverter stage 212 and is further coupled to a timing controlled transistor 210. The timing circuit 216 is not supplied with power until the signal at the output of the inverter stage 212 is HIGH. When timing circuit 216 is provided with power, it turns the timing controlled transistor 210 ON. There is also shown a supplemental transistor 208 which is serially connected to the timing controlled transistor 210. Additionally the gate of supplemental transistor 208 is coupled to the output of the inverter stage 212 and is only powered on when the signal at the inverter stage 212 indicates that an ESD event has been detected. The source of the supplemental transistor 208 is coupled to the RC network of the trigger circuit. When both the supplemental transistor 208 and the timing controlled transistor 210 are turned ON, capacitor 206 of the RC network is prevented from charging. Because capacitor 206 is not able to charge, the input to the inverter stage 212 is LOW therefore the output of the inverter stage is HIGH, which keeps clamp transistor 214 ON. This ensures that clamp transistor 214 remains ON during the entire ESD event. The duration of this state is controlled by the timing circuit 216. Because the timing circuit is responsible for controlling the duration the clamp transistor 214 stays engaged during an ESD event, the RC network can be designed in such a way to reduce the RC constant. When a configurable time period for the timing circuit expires, the timing controlled transistor 210 is turned OFF which disconnects the path to ground 204. In this state, capacitor 206 is allowed to begin charging and continue normal operation. In various embodiments, the timer may remain powered on and enabled upon the detection of an ESD event.

Figure 3A:
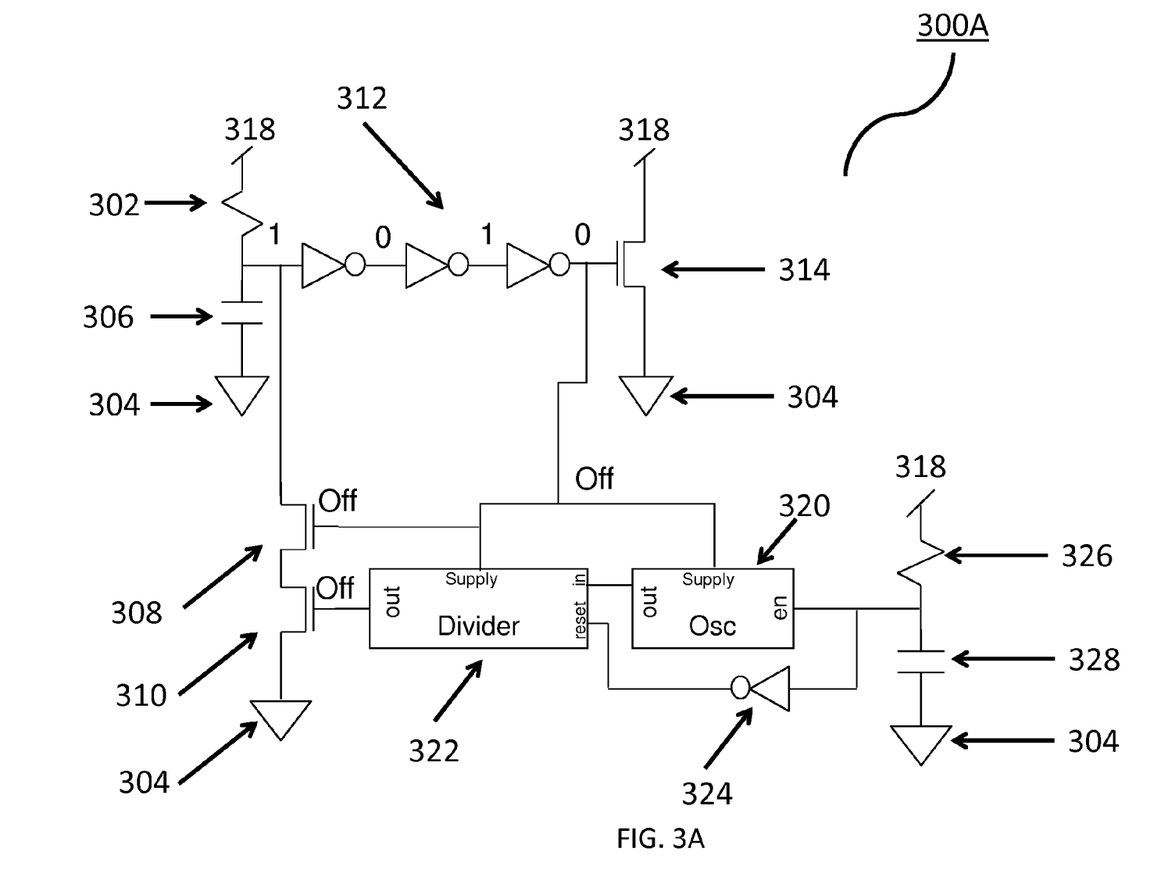
FIG. 3A is a block diagram illustrating an ESD power clamp in accordance with an exemplary embodiment.

Referring now to FIG. 3A, system 300A depicts the normal operation when an ESD event has not been detected. FIG. 3A shows clamp transistor 314 in the OFF state. FIG. 3A also shows the timing circuit 216 of FIG. 2 comprises oscillator circuit 320 and divider circuit 322, where the oscillator circuit 320 is coupled to the divider circuit 322.

During normal operation (no ESD event is detected) of the system the clamp transistor 314, oscillator circuit 320, and the divider circuit 322 remain powered OFF. Since these components are powered OFF during normal operation there are no additional leakage issues caused by these components. Since there is no detected ESD event the capacitor 306 is allowed to charge. When capacitor 306 is allowed to charge, the input of the inverter stage 312 is HIGH which keeps the clamp transistor 314 off. The oscillator circuit 322 and divider circuit 320 are designed so that the resulting timing is larger than an ESD pulse duration. For example, 2 µs duration is typical for clamp devices.

FIG. 3A further shows a reset circuit comprising resistor 326, capacitor 328, and inverter 324. In an exemplary embodiment, the RC network of the reset circuit comprising resistor 326 and capacitor 328 is a fast RC network similar to the RC network of the trigger circuit. The reset circuit is coupled to an input of the divider circuit 322 to initialize the divider circuit 322 to 0 prior to operation. The divider circuit 322 counts the number cycles input from the oscillator 320. During normal operation the timing circuit, reset circuit, and transistors 308, 310 are not supplied with power.

Figure 3B:
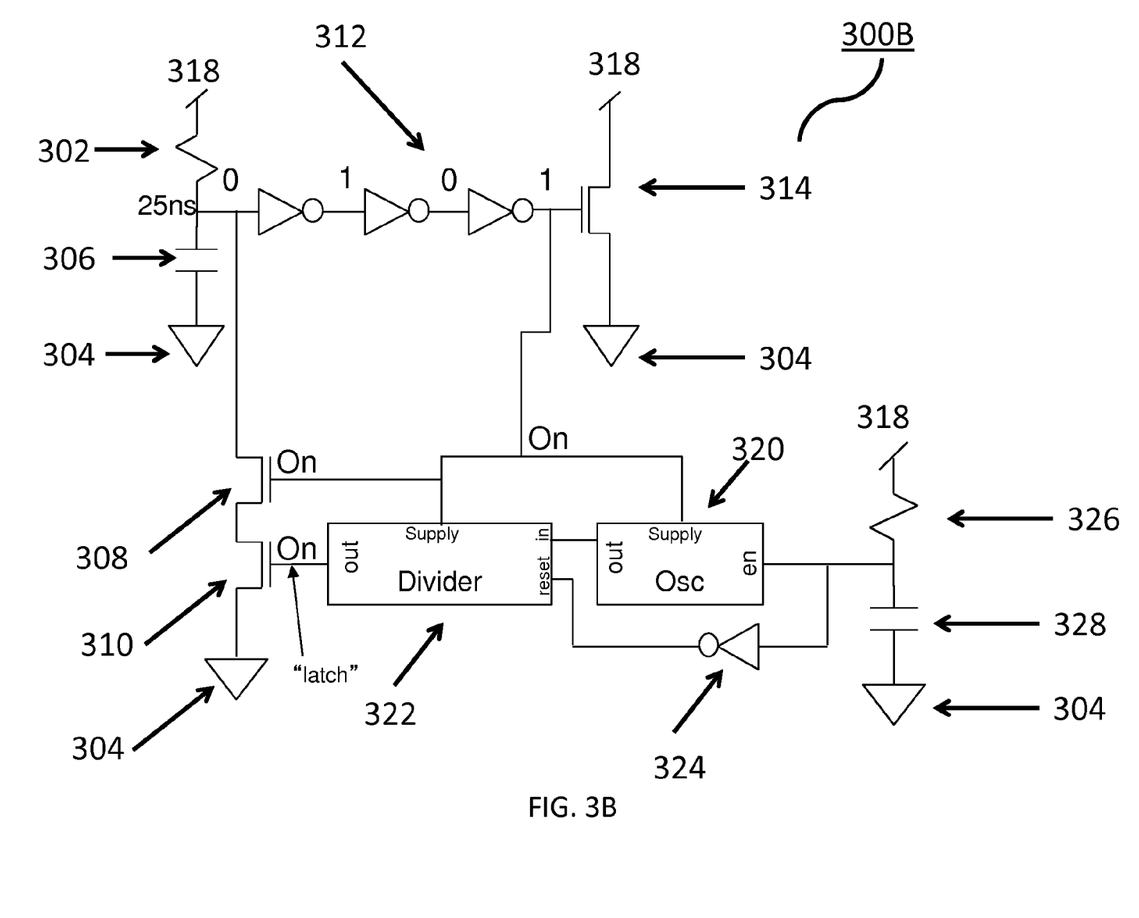
FIG. 3B is a block diagram illustrating an ESD power clamp in accordance with an exemplary embodiment.

FIG. 3B illustrate a system 300B, where an ESD event has been detected. The RC network including resistor 302 and capacitor 306 detects an ESD event which indicates a LOW signal to the input of inverter stage 312. As a result, the inverter stage 312 outputs a HIGH signal to the gate of clamp transistor 314 turning the clamp transistor 314 ON. In this state a discharge path to ground 304 is provided for the detected ESD event.

In addition, the output of inverter stage 312 is coupled to the timing circuit components including oscillator circuit 320 and divider circuit 322, and the also output supplies the timing circuit components with the HIGH signal. Supplemental transistor 308 is also coupled to the output of the inverter stage 312 and receives the HIGH signal which turns the transistor on. When powered ON, oscillator circuit 320 is activated and the divider circuit 322 begins counting the cycles input from the oscillator circuit 320. As a result the output of the divider circuit 320 is held HIGH for a period of time turning the timing controlled transistor 310 ON. When both the supplemental transistor 308 and the timing controlled transistor 310 are turned ON, the capacitor 306 of the RC network is prevented from charging. Since the capacitor 306 is unable to charge the clamp transistor 314 is maintained ON.

In an exemplary embodiment, the reset circuit of FIG. 3B may be coupled to the gate of clamp transistor 314. Resistor 326 of the reset circuit is shown connected to power supply 318. In other embodiments, resistor 326 can be connected to the gate of clamp transistor 314. In doing so, the reset circuit will only be supplied with power when an ESD event is detected by the RC network. When the ESD event is detected, the input of the inverter stage 312 will go LOW and the output of the inverter stage 312 which is coupled to the clamp transistor 314 will go HIGH. As a result the clamp transistor 314 will turn ON and the reset circuit will be supplied with power.

Figure 4:
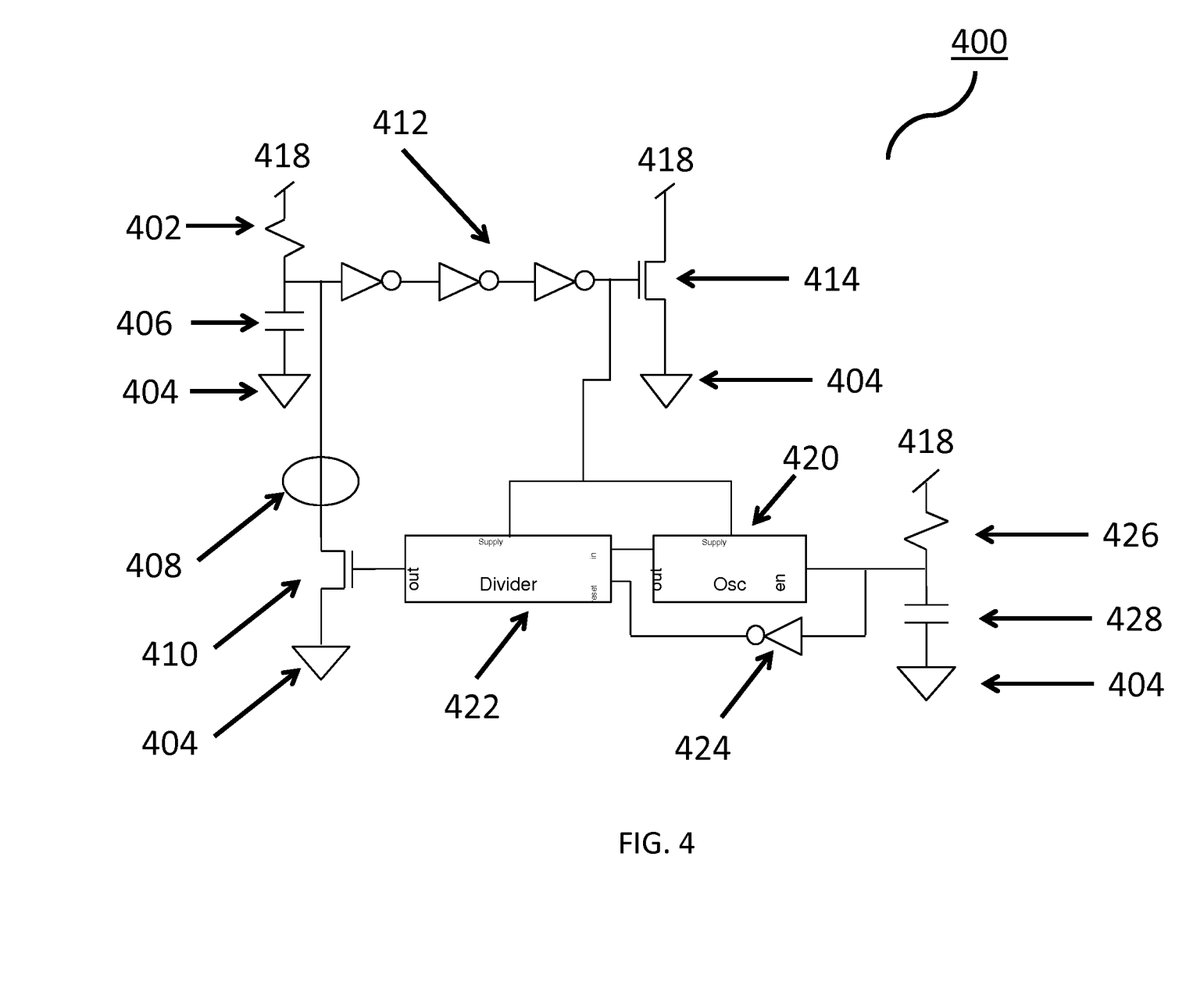
FIG. 4 is a block diagram illustrating an ESD power clamp in accordance with another exemplary embodiment.

Referring now to FIG. 4, a system 400 similar to the system 200 of FIG. 2 is shown. In an exemplary embodiment, the use of a supplemental transistor is not required as shown by location 408. When an ESD event is detected clamp transistor 414 is turned ON and a discharge path is provided to ground 404 for the ESD event. Oscillator circuit 420 and divider circuit 422 are powered ON when an ESD event is detected. As the oscillator circuit 420 and the divider circuit 422 are powered ON, the timing controlled transistor 410 is turned ON which prevents capacitor 406 from charging up during this period. After the divider circuit 422 has counted a configured number of transitions from the oscillator circuit 420, timing controlled transistor 410 is turned OFF and normal operation is resumed where capacitor 406 is allowed to charge.

Figure 5:
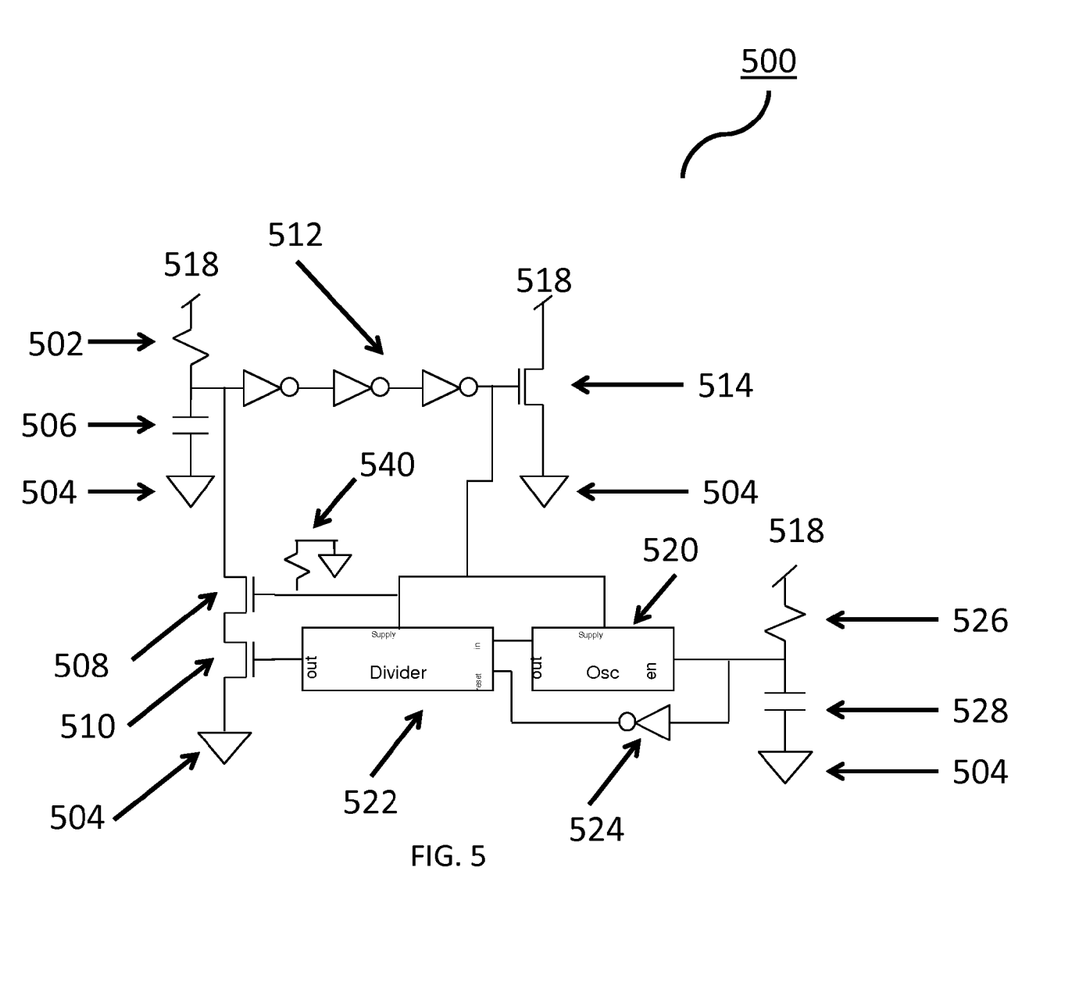
FIG. 5 is a block diagram illustrating an ESD power clamp in accordance with another exemplary embodiment.

Referring now to FIG. 5, system 500 depicts a similar system 200 as shown in FIG. 2. In FIG. 5 the system 500 includes the additional resistor 540 which ensures that, by default and at the onset of a power ramp, supplemental transistor 508 is turned off. This guarantees that the capacitor 506 is allowed to charge up unless an ESD event turns the power clamp on through inverters 512.

Figure 6:
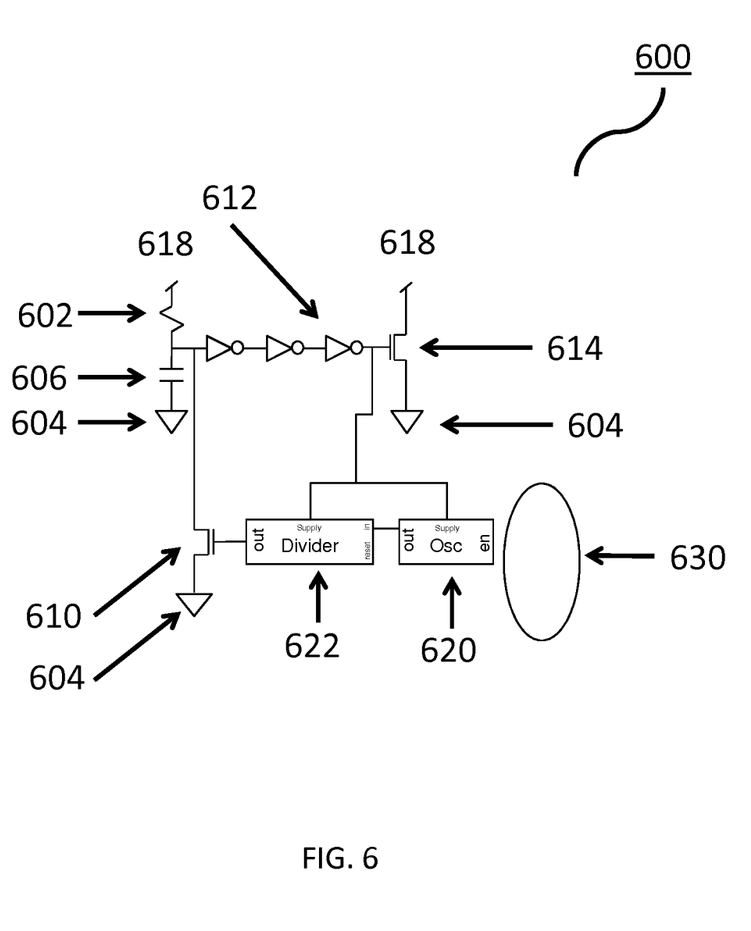
FIG. 6 is a block diagram illustrating an ESD power clamp in accordance with another exemplary embodiment.

Referring now to FIG. 6, system 600 which is similar to system 200 of FIG. 2 is shown. System 600 shows an RC network including resistor 602 and capacitor 606. Inverter stage 612 is coupled to the RC network and the gate of clamp transistor 614. FIG. 6 also includes a timing circuit which comprises divider circuit 622 and oscillator circuit 620. In an exemplary embodiment, the system 600 does not require a reset circuit, such as the reset circuit shown in FIG. 3A, to initialize the divider circuit 622. The location 630 illustrates the lack of a reset circuit. So long as divider circuit 622 is initialized properly at start up there is no need for the reset circuit. When an ESD event is detected, power is supplied to the divider circuit 622 and oscillator circuit 620. The divider circuit 622 will count the number of transitions from the received signal of the oscillator circuit 620 and maintain the output of the divider circuit 622 HIGH for a configurable period of time. The output is supplied to the gate of timing controlled transistor 610, which prevents the capacitor 606 of the RC network from charging up.

In one embodiment, the transistors can be any type of transistor known in the art including but not limited to bi-polar junction transistors, MOS, FET, and others. Additionally the transistors may be n-type or p-type. In an embodiment resistors may be formed from active or passive components and may be used without departing from the scope of the disclosure. In an exemplary embodiment the ramp of a power supply voltage refers to the voltage increasing from a low state to high state voltage levels. In another exemplary embodiment the circuit can be positioned in such a way to provide maximum protection to the IC or device being protected. In other embodiments timers can be implemented with RC based timers, digital timers, or any other timer. In exemplary embodiments ESD power clamps can discharge ESD currents/voltages from a power supply node to a ground node to protect other circuits from being damaged due to ESD currents/voltages.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system for protecting a circuit using a clamping device comprising:
    a trigger circuit comprising a resistor-capacitor (RC) network and an inverter stage circuit, wherein the trigger circuit is configured to detect an electrostatic discharge (ESD) event;
    a clamp transistor coupled to the trigger circuit, wherein the clamp transistor is controlled by a signal received from the trigger circuit;
    a timing circuit coupled to the trigger circuit and a timing controlled transistor, wherein the timing circuit controls the timing controlled transistor to prevent the capacitor in the RC network from charging when the timing circuit is initiated; and
    the timing controlled transistor coupled to the trigger circuit and the timing circuit, wherein the timing controlled transistor switches states based on an output of the timing circuit.

2. The system of claim 1, wherein the timing circuit comprises an oscillator circuit and a divider circuit, wherein the oscillator circuit provides an input to the divider circuit and the divider circuit is coupled to the timing controlled transistor.

3. The system of claim 1, wherein the timing circuit is powered on based on the trigger circuit detecting the ESD event.

4. The system of claim 1, wherein the timing circuit is activated based on the trigger circuit detecting the ESD event.

5. The system of claim 2, further comprising a reset circuit for resetting the divider circuit, wherein the reset circuit is coupled to the divider circuit.

6. The system of claim 5, wherein the reset circuit is coupled to the divider circuit and the gate of the clamp transistor.

7. The system of claim 2, further comprising a supplemental transistor serially connected to the timing controlled transistor, wherein the supplemental transistor is controlled by an output of the trigger circuit.

8. The system of claim 7, wherein the supplemental transistor is coupled to ground to prevent the supplemental transistor from being activated by a low voltage signal.

9. A power clamp apparatus for protecting a circuit, comprising:
   a trigger circuit comprising an RC network and an inverter stage circuit, wherein the trigger circuit is configured to detect an electrostatic discharge (ESD) event;
   a clamp transistor coupled to the trigger circuit, wherein the clamp transistor is controlled by a signal received from the trigger circuit;
   a timing circuit coupled to the trigger circuit and a timing controlled transistor, wherein the timing circuit controls the timing controlled transistor to prevent the capacitor in the RC network from charging when the timing circuit is initiated; and
   the timing controlled transistor further being coupled to the trigger circuit and the timing circuit, wherein the timing controlled transistor switches states based on an output of the timing circuit.

10. The apparatus of claim 9, wherein the timing circuit comprises an oscillator circuit and a divider circuit, wherein the oscillator circuit provides an input to the divider circuit and the divider circuit being connected to the timing controlled transistor.

11. The apparatus of claim 9, wherein the timing circuit is powered on based on the trigger circuit detecting the ESD event.

12. The apparatus of claim 9, wherein the timing circuit is activated based on the trigger circuit detecting the ESD event.

13. The apparatus of claim 10, further comprising a reset circuit for resetting the divider circuit, wherein the reset circuit is coupled to the divider circuit.

14. The apparatus of claim 10, wherein the reset circuit is coupled the gate of the clamp transistor.

15. The apparatus of claim 9, further comprising a supplemental transistor serially connected to the timing controlled transistor, wherein the supplemental transistor is controlled by an output of the trigger circuit.

16. The system of claim 9, wherein the supplemental transistor is coupled to ground to prevent the supplemental transistor from being activated by low voltage signal.

17. A method for protecting a circuit using a power clamp device, comprising:
   detecting an ESD event by a trigger circuit, wherein the trigger circuit includes an RC network and an inverter stage circuit;
   providing, by the trigger circuit, a trigger signal to activate a clamp transistor, wherein the clamp transistor provides a path to discharge an ESD signal; and
   generating by a timing circuit a timing signal to control a timing controlled transistor, wherein the timing controlled transistor prevents a capacitor in the RC network from charging for a period of time when the ESD event is detected.

18. The method of claim 17, wherein the timing circuit comprises an oscillator circuit and a divider circuit.

19. The method of claim 18, further comprising supplying power to an oscillator circuit and a divider circuit of the timing circuit based on the detection of the ESD event.

20. The method of claim 18, wherein the timing circuit further comprises a reset circuit coupled to the divider circuit.

* * * * *